(12) United States Patent
Jin

(10) Patent No.: US 12,491,453 B1
(45) Date of Patent: Dec. 9, 2025

(54) METHOD OF MAKING A FILTER WITH GROUND ANIMAL BONE GRANULES AND FILTERING THEREWITH

(71) Applicant: Tina Jin, Cupertino, CA (US)

(72) Inventor: Tina Jin, Cupertino, CA (US)

(73) Assignee: Tina Jin, Cupertino, CA (US)

(*) Notice: Subject to any disclaimer, the term of this patent is extended or adjusted under 35 U.S.C. 154(b) by 0 days.

(21) Appl. No.: 19/241,332

(22) Filed: Jun. 17, 2025

(51) Int. Cl.
| | |
|---|---|
| B01D 24/00 | (2006.01) |
| B01D 24/10 | (2006.01) |
| B01D 39/02 | (2006.01) |
| C02F 1/00 | (2023.01) |
| C02F 1/02 | (2023.01) |
| C02F 1/28 | (2023.01) |
| C02F 1/62 | (2023.01) |
| C02F 101/20 | (2006.01) |

(52) U.S. Cl.
CPC ......... B01D 24/001 (2013.01); B01D 24/008 (2013.01); B01D 24/105 (2013.01); B01D 39/02 (2013.01); C02F 1/002 (2013.01); C02F 1/004 (2013.01); C02F 1/02 (2013.01); C02F 1/281 (2013.01); C02F 1/62 (2013.01); *B01D 2101/00* (2013.01); *B01D 2239/0283* (2013.01); *B01D 2239/10* (2013.01); *B01D 2239/1241* (2013.01); *C02F 2101/20* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| X5013 I1 | * | 2/1828 | Hall | 210/290 |
| 208,909 A | * | 10/1878 | Jewett | B01D 24/004 |
| | | | | 210/474 |
| 219,817 A | * | 9/1879 | Jewett | C02F 1/42 |
| | | | | 210/474 |
| 222,731 A | * | 12/1879 | Peterson | B01D 29/23 |
| | | | | 210/411 |
| 263,599 A | * | 8/1882 | Schwalb | C02F 1/42 |
| | | | | 210/474 |
| 264,463 A | * | 9/1882 | Koeppel | B01D 24/04 |
| | | | | 210/502.1 |
| 293,745 A | * | 2/1884 | Hyatt | B01D 24/4636 |
| | | | | 210/279 |
| 296,939 A | * | 4/1884 | Denton | C02F 1/003 |
| | | | | 210/291 |
| 533,136 A | * | 1/1895 | Miller | B01D 17/045 |
| | | | | 210/284 |
| 537,489 A | * | 4/1895 | Sherwood | B01D 27/02 |
| | | | | 210/474 |
| 621,803 A | * | 3/1899 | Felts | B01D 29/01 |
| | | | | 210/255 |
| 961,180 A | * | 6/1910 | Utley | B01D 24/24 |
| | | | | 210/279 |
| 1,518,289 A | * | 12/1924 | Wooster | C01B 32/30 |
| | | | | 502/417 |
| RE16,225 E | * | 12/1925 | Wooster | C01B 32/30 |
| | | | | 502/34 |

(Continued)

*Primary Examiner* — Robert J Popovics
(74) *Attorney, Agent, or Firm* — Junhe Law Office P.C.; Yi Zhang (57) ABSTRACT

The present disclosure provides a water filter device generated using animal bone. In some embodiments, the water filter device comprises a tube containing a series of layers of animal bone granules.

13 Claims, 5 Drawing Sheets

(56) References Cited

U.S. PATENT DOCUMENTS

| | | | | |
|---|---|---|---|---|
| 2,057,237 | A * | 10/1936 | Hoop | C02F 1/003 210/287 |
| 2,145,901 | A * | 2/1939 | Shoemaker | C02F 1/64 252/189 |
| 2,395,900 | A * | 3/1946 | Mueller | C11B 1/12 210/189 |
| 3,382,983 | A * | 5/1968 | Stewart | B01D 24/008 210/502.1 |
| 3,536,197 | A * | 10/1970 | Ward | B01D 24/40 210/120 |
| 3,544,457 | A * | 12/1970 | Tulley | B01D 24/007 210/500.1 |
| 3,580,725 | A * | 5/1971 | Tulley | A23K 10/26 530/859 |
| 3,704,786 | A * | 12/1972 | Lerner | B01J 2/006 210/504 |
| 3,814,247 | A * | 6/1974 | Hirs | B01D 24/12 210/279 |
| 3,865,727 | A * | 2/1975 | Broling | B01D 29/6476 210/162 |
| 3,876,546 | A * | 4/1975 | Hsiung | B01D 39/06 210/275 |
| 3,900,395 | A * | 8/1975 | Hirs | B01D 24/007 210/793 |
| 3,933,629 | A * | 1/1976 | Smith | C02F 3/10 210/150 |
| 4,048,068 | A * | 9/1977 | Hirs | B01D 24/105 210/793 |
| 4,166,037 | A * | 8/1979 | Montagnon | C02F 1/288 210/275 |
| 4,197,205 | A * | 4/1980 | Hirs | B01D 24/12 210/275 |
| 4,246,119 | A * | 1/1981 | Alldredge | B01D 24/4668 210/279 |
| 4,322,299 | A * | 3/1982 | Scholten | B01D 24/007 210/794 |
| 4,374,029 | A * | 2/1983 | Jaisinghani | B01D 17/08 210/275 |
| 4,437,982 | A * | 3/1984 | Wasson | B03B 1/04 209/171 |
| 4,626,359 | A * | 12/1986 | Bennett | B01D 39/06 210/275 |
| 4,668,405 | A * | 5/1987 | Boze | B01D 24/12 210/795 |
| 4,747,945 | A * | 5/1988 | Kreusch | B01D 39/06 210/290 |
| 4,765,892 | A * | 8/1988 | Hulbert | C02F 1/004 210/290 |
| 4,851,122 | A * | 7/1989 | Stanley | B01J 39/04 502/402 |
| 4,902,427 | A * | 2/1990 | Szczepanik | C02F 1/283 210/497.1 |
| 5,064,534 | A * | 11/1991 | Busch | B01J 47/012 210/502.1 |
| 5,087,357 | A * | 2/1992 | Villa | A01K 63/045 210/167.25 |
| 5,108,614 | A * | 4/1992 | Ross | C02F 1/283 210/283 |
| 5,711,015 | A * | 1/1998 | Tofe | C02F 1/286 588/1 |
| 6,013,181 | A * | 1/2000 | Thellmann | C02F 1/003 210/287 |
| 6,197,193 | B1 * | 3/2001 | Archer | C02F 1/003 210/502.1 |
| 6,217,775 | B1 * | 4/2001 | Conca | B01J 20/048 588/1 |
| 6,319,400 | B1 * | 11/2001 | Hirs | B01D 24/4631 210/275 |
| 6,322,705 | B1 * | 11/2001 | Stornes | B01D 24/4642 210/275 |
| 7,025,887 | B1 * | 4/2006 | Kirts | B01D 21/0039 210/170.03 |
| 7,029,578 | B2 * | 4/2006 | Spruce | C02F 1/288 210/275 |
| 7,045,067 | B2 * | 5/2006 | Brown | B01D 24/4631 210/275 |
| 7,077,272 | B2 * | 7/2006 | Shimada | A01K 63/04 424/539 |
| 7,156,994 | B1 * | 1/2007 | Archer | C02F 1/288 210/282 |
| 7,160,465 | B2 * | 1/2007 | Kirts | E03F 1/002 210/170.03 |
| 7,527,727 | B2 * | 5/2009 | Parke | C02F 1/283 210/259 |
| 7,638,047 | B1 * | 12/2009 | Jones | C02F 1/288 210/252 |
| 7,658,845 | B2 * | 2/2010 | Lee | C02F 1/003 210/287 |
| 8,092,694 | B2 * | 1/2012 | Brunard | C10G 2/32 210/807 |
| 8,366,936 | B1 * | 2/2013 | Jones | C02F 1/288 210/663 |
| 8,864,989 | B2 * | 10/2014 | Koishi | C02F 1/004 210/291 |
| 9,199,859 | B2 * | 12/2015 | Spittle | C02F 1/001 |
| 12,276,098 | B1 * | 4/2025 | Chittoor | E03F 5/0404 |
| 2002/0096466 | A1 * | 7/2002 | Perry, Jr. | B01D 24/105 210/290 |
| 2004/0129653 | A1 * | 7/2004 | Spruce | C02F 1/288 210/807 |
| 2005/0087495 | A1 * | 4/2005 | Parke | C02F 1/283 210/688 |
| 2007/0181511 | A1 * | 8/2007 | Smith | C02F 1/281 210/792 |
| 2008/0128338 | A1 * | 6/2008 | Parke | C02F 1/283 210/284 |
| 2010/0276360 | A1 * | 11/2010 | Smith | C02F 1/28 210/287 |
| 2012/0223029 | A1 * | 9/2012 | Smith | C02F 1/001 210/290 |
| 2012/0241385 | A1 * | 9/2012 | McCarthy | B01D 39/06 252/175 |
| 2013/0175222 | A1 * | 7/2013 | Spittle | C02F 1/283 210/683 |
| 2016/0340209 | A1 * | 11/2016 | Kashihara | C02F 1/288 |

\* cited by examiner

METHOD OF MAKING A FILTER WITH GROUND ANIMAL BONE GRANULES AND FILTERING THEREWITH

FIELD OF THE INVENTION

The present invention generally relates to water purification. More specifically, the present invention relates to a device for water filtration, the method of making the device, and the use of the device.

BACKGROUND OF THE INVENTION

Drinking dirty water can cause various conditions and diseases, such as nerve damage, lung damage and cholera. Dirty water results in 1 death every 10 seconds worldwide, death of 5000 children daily, and 3.5 million deaths annually, which is far more than fatalities by natural disasters and conflicts. Clean water shortages effects ~2 billion people daily. On the other hand, approximately 130 billion kg of left-over animal bones are wasted worldwide every year.

Various water filtration methods have been developed, each suited for different contaminants and applications. Mechanical filtration uses a physical barrier, e.g., mesh, fabric, or ceramic, to remove suspended solids, such as dirt, sediment, rust and debris. Mechanical filtration is only used for pre-treatment as it does not remove microbes or chemicals. Activated carbon filtration adsorbs contaminants onto the surface of activated carbon granules or blocks to remove chlorine, volatile organic compounds, and some pesticides. However, it does not remove heavy metals, nitrates or microbes effectively. Reverse osmosis forces water through a semipermeable membrane, removing dissolved salts and molecules. It removes a large variety of contaminants including lead, arsenic, fluoride, nitrates, sulfates, bacteria and viruses. However, reverse osmosis equipment is very expensive and involves complicated installation. Ultraviolet (UV) disinfection damages microbial DNA, rendering pathogens inactive, thus removing bacteria, viruses, protozoa. However, it does not remove chemicals or solids and must be used with pre-filtration. Chlorine treatment kills or inactivate microorganisms in water, which is one of the most widely used methods for treating drinking water. However, the method involves complicated device installation and may adversely affect health.

Therefore, an economic and environmentally friendly solution is needed for water filtration and purification. The present invention fulfills this need, among others.

BRIEF SUMMARY OF THE INVENTION

In one aspect, the present disclosure provides a method of generating a water filter device. In some embodiments, the method comprises: (a) obtaining an animal bone; (b) boiling the animal bone to remove oil; (c) drying the animal bone; (d) grinding the animal bone to bone granules; (e) sieving the bone granules into: coarse size granules having a diameter of 0.4-0.8 mm, medium size granules having a diameter of 0.2-0.4 mm, and fine size granules having a diameter of less than 0.2 mm; and (f) obtaining a tube having a top end and a bottom end, wherein the bottom end is covered with a water permeable barrier; and (g) placing the bone granules in the tube, in an order from the bottom end of the tube to the top end of the tube: a first layer of coarse size granules, a layer of fine size granules, a layer of medium size granules, and a second layer of coarse size granules.

In some embodiments, the method further comprises before step (b) a step of cleaning the animal bone to remove residue on the animal bone. In some embodiments, the method further comprises before step (b) a step of cutting the animal bone into pieces.

In some embodiments, the animal bone is cow bone, lamb bone or pig bone. In some embodiments, the animal bone is grinded by a bean grinder. In some embodiments, the animal bone is grinded by mortar and pestle.

In another aspect, the present disclosure provides a water filter device generated according to the method disclosed herein. In some embodiments, the water filter device comprises a tube containing a series of layers of animal bone granules. In some embodiments, the series of layers comprises in an order from the top end of the tube to the bottom end of the tube: a first layer of coarse size granules, a layer of medium size granules, a layer of fine size granules, and a second layer of coarse size granules, wherein the coarse size granules has a diameter of 0.4-0.8 mm, the medium size granules has a diameter of 0.2-0.4 mm, and the fine size granules has a diameter of less than 0.2 mm. In some embodiments, each layer of bone granules has a thickness of about 0.8 inch.

In some embodiments, the tube is a vinyl tube. In some embodiments, the bottom end of the tube is covered with a cloth. In some embodiments, tube has a length of about 3.5 inches. In some embodiments, the tube has a diameter of about 1 inch.

The present disclosure in another aspect provides a method of filtering water. In some embodiments, the method comprises: obtaining a water filter device disclosed herein; pouring water from the top of the water filter device; and collecting filtered water from the bottom of the water filter.

In some embodiments, the method disclosed herein further comprises after step (g) a step of boiling the filtered water.

In some embodiments, the filtered water is drinkable.

It should be understood that both the foregoing general description and the following detailed description are exemplary and explanatory only, and do not intend to limit the disclosure.

BRIEF DESCRIPTION OF THE FIGURES

The following drawings form part of the present specification and are included to further demonstrate certain aspects of the present disclosure. The disclosure may be better understood by reference to one or more of these drawings in combination with the detailed description of specific embodiments presented herein.

Through the above accompany drawings, the specific embodiments of the disclosure have been illustrated, and a more detailed description may be given as below. These drawings and the textual description are not intended to limit the scope of the concept of the disclosure in any manner, but to explain the concept of the disclosure to those skilled in the art with reference to particular embodiments.

DETAILED DESCRIPTION OF THE INVENTION

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Where a range of value is provided, it is understood that each intervening value, to the tenth of the unit of the lower limit unless the context clearly dictate otherwise, between the upper and lower limit of that range and any other stated or intervening value in that stated range, is encompassed within the disclosure, subject to any specifically excluded limit in the stated range. Where the stated range includes one or both of the limits, ranges excluding either or both of those included limits are also included in the disclosure.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without their specific details. In other instances, methods, procedures and components have not been described in detail so as not to obscure the related relevant function being described. Also, the description is not to be considered as limiting the scope of the implementations described herein. It will be understood that descriptions and characterizations of the embodiments set forth in this disclosure are not to be considered as mutually exclusive, unless otherwise noted.

Definition

The following definitions are used in the disclosure:

It is understood that as used herein and in the appended claims, the singular forms "a," "an," and "the" include the plural reference unless the context clearly dictates otherwise. Thus, for example, a reference to a "bridge probe" is a reference to one or more bridge probes, and includes equivalents thereof known to those skilled in the art and so forth.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Water Filtration Device

The present disclosure in one aspect provides a water filtration device which fulfills the needs for economically and environment-friendly purifying water. In some embodiments, the water filtration device comprises a tube containing a series of layers of animal bone granules.

The tube of the water filtration device can be made of any appropriate material preventing leak of water, e.g., wood, metal (e.g., steel, aluminum, and copper), plastic (e.g., polyvinyl chloride (PVC), polyethylene (PE), and polypropylene (PP)), silicon, rubber, ceramic, etc.

The water filtration device disclosed herein can be portable or stationary. Typically, the tube of a portable water filtration device disclosed herein has a height of about 2 to 5 inches, e.g., 2 inches, 2.5 inches, 3 inches, 3.5 inches, 4 inches, 4.5 inches, or 5 inches. In some embodiments, the tube of a portable water filtration device disclosed herein has an inner diameter of about 0.5 to 1.5 inches, e.g., 0.5 inch, 0.6 inch, 0.7 inch, 0.8 inch, 0.9 inch, 1 inch, 1.1 inches, 1.2 inches, 1.3 inches, 1.4 inches or 1.5 inches.

In some embodiments, the tube of a stationary water filtration device disclosed herein has a height of about 1 to 5 feet, e.g., 1 foot, 1.5 feet, 2 feet, 2.5 feet, 3 feet, 3.5 feet, 4 feet, 4.5 feet or 5 feet. In some embodiments, the tube of a stationary water filtration device disclosed herein has an inner diameter of about 0.25 to 0.75 foot, e.g., 0.25 foot, 0.3 foot, 0.35 foot, 0.4 foot, 0.45 foot, 0.5 foot, 0.55 foot, 0.6 foot, 0.65 feet, 0.7 foot or 0.75 foot.

In some embodiments, the tube of a portable water filtration device disclosed herein has a wall of a thickness of about 1 to 10 millimeter (mm), e.g., 1 mm, 2 mm, 3 mm, 4 mm, 5 mm, 6 mm, 7 mm, 8 mm, 9 mm or 10 mm. In some embodiments, the tube of a stationary water filtration device disclosed herein has a wall of a thickness of about 10 to 20 millimeter (mm), e.g., 10 mm, 11 mm, 12 mm, 13 mm, 14 mm, 15 mm, 16 mm, 17 mm, 18 mm, 19 mm or 20 mm.

The series of layers contained in the tube not only can effectively filter the impurities in the water as described in detail below, but also can remove heavy metal in the water via the calcium phosphate content in the bone. In some embodiments, the series of layers comprises in an order from the top end of the tube to the bottom end of the tube: a first layer of coarse size granules, a layer of medium size granules, a layer of fine size granules, and a second layer of coarse size granules, wherein the coarse size granules has a diameter of 0.4-0.8 mm, the medium size granules has a diameter of 0.2-0.4 mm, and the fine size granules has a diameter of less than 0.2 mm.

In some embodiments, each layer of bone granules of a portable water filtration device disclosed herein has a thickness of about 0.5~1 inch, e.g., about 0.5 inch, 0.6 inch, 0.7 inch, 0.8 inch, 0.9 inch or 1 inch. In some embodiments, each layer of bone granules of a stationary water filtration device disclosed herein has a thickness of about 0.2~1 foot, e.g., about 0.25 foot, 0.3 foot, 0.4 foot, 0.5 foot, 0.6 foot, 0.7 foot, 0.8 foot, 0.9 foot or 1 foot.

In some embodiment, the bottom end of the tube is covered with a water permeable barrier to contain the animal bone granules. Examples of water permeable barrier include without limitation paper, fabric, cloth. In some embodiments, the water permeable barrier is a cloth. In some embodiments, the water permeable barrier is secured to the bottom end of the tube with a rubber band.

In some embodiments, the first layer of coarse size granules is capable of blocking out larger-sized impurities, such as insects, gravels, etc. The layer of medium size granules is capable of blocking out medium-sized impurities such as sand, insect pats, etc. The layer of fine size granules is capable of blocking out small impurities such as bacteria, dust particles, etc. The second layer of coarse size granules is capable of blocking the fine layer from escaping through the water permeable barrier.

A more detailed description of the water filtration device described herein may be given to exemplary embodiments, examples of which are illustrated in the accompany drawings. The embodiments described in the following exemplary embodiments do not represent all of the embodiments in consistent with the present disclosure. On the contrary, they are only examples of devices and methods in consistent with some aspects of the present disclosure, as set forth in the appended claims.

Figure 1:
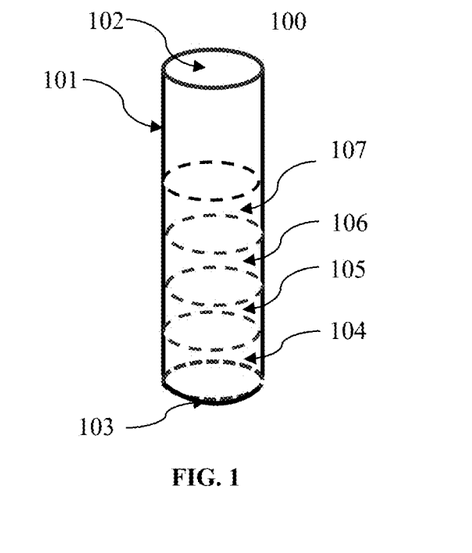
FIG. 1 illustrates an exemplary structure of the water filter device according to an embodiment of the invention.

FIG. 1 shows an overview of the water filtration device according to an embodiment of the present disclosure. As can be seen from FIG. 1, the water filtration device 100 may include: a tube 101 which has a top end 102 and a bottom end 103. The bottom end 103 is covered with a cloth secured by a rubber band (not shown). The tube 101 contains, from the bottom end 103 to the top end 102, a layer of coarse size granules 104, a layer of fine size granules 105, a layer of medium size granules 106, and a second layer of coarse size granules 107.

Method of Manufacture

Figure 2:
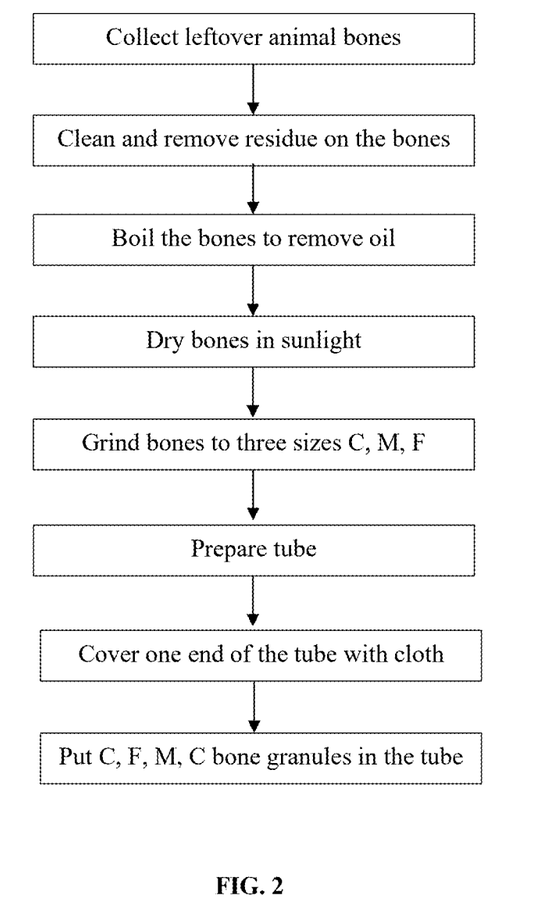
FIG. 2 illustrates a flow chart showing the process of making an exemplary water filter device according to an embodiment of the invention.

The present disclosure in another aspect provides a method of generating a water filter device described herein. FIG. 2 illustrates a flow chart showing the process of making an exemplary water filter device according to an embodiment of the invention. Now referring to FIG. 2, in the first step, the exemplary method comprises obtaining an animal bone. The animal bones can be used in the method described herein include without limitation cow bone, lamb bone and pig bone. In typical examples, the animal bones used in the method described herein are left over from meals.

Referring to FIG. 2, in the next step, the exemplary method comprises boiling the animal bones to remove oil. In some embodiments, the bones are boiled for one hour, two hours, three hours, four hours, five hours or more. In some embodiments, before the bones are boiled, the bones are cleaned to remove residue on the animal bone. In some embodiments, before the bones are boiled, the bones are cut into pieces. Typically, the bones are cut into pieces of about 1-2 inches.

Referring to FIG. 2, in the next step, the exemplary method comprises drying the animal bone. In some embodiments, the bones are dried under sun for one day, two days, three days, four days, five days or more.

Referring to FIG. 2, in the next step, the exemplary method comprises grinding the animal bone to bone granules. In some embodiments, the animal bone is grinded by a bean grinder. In some embodiments, the animal bone is grinded by mortar and pestle. In some embodiments, the bones are grinded into granules of a diameter from about 0.1 mm to about 1 mm. In some embodiments, the bones are grinded into granules of a diameter close to coarse size (i.e., about 0.4-0.8 mm, labeled as C in FIG. 2), medium size (about 0.2-0.4 mm, labeled as M in FIG. 2) and fine size (less than 0.2 mm, labeled as F in FIG. 2).

Referring to FIG. 2, in the next step, the exemplary method comprises sieving the bone granules into coarse size, medium size and fine size. Typically, the coarse size granules have a diameter of 0.4-0.8 mm, the medium size granules have a diameter of 0.2-0.4 mm, and the fine size granules have a diameter of less than 0.2 mm.

Referring to FIG. 2, in the next step, the exemplary method comprises obtaining a tube having a top end and a bottom end, wherein the bottom end is covered with a water permeable barrier. The tube and the water permeable barrier are described elsewhere in the disclosure.

Referring to FIG. 2, in the next step, the exemplary method comprises placing the bone granules in the tube, in an order from the bottom end of the tube to the top end of the tube: a first layer of coarse size granules, a layer of fine size granules, a layer of medium size granules, and a second layer of coarse size granules. In some embodiments, each layer of bone granules has a thickness of about 0.5~1 inch, e.g., about 0.5 inch, 0.6 inch, 0.7 inch, 0.8 inch, 0.9 inch or 1 inch.

The water filtration device disclosed herein can be made from various bones, which increases material accessibility. In some embodiments, the filter medium of the device is made entirely of animal bone without mixing with other materials. The making process involves simple process and equipment, which needs no expensive technologies. As a result, the making of the water filtration device disclosed herein incurs nearly zero cost, further increasing the accessibility of the device.

Method of Use

Figure 3:
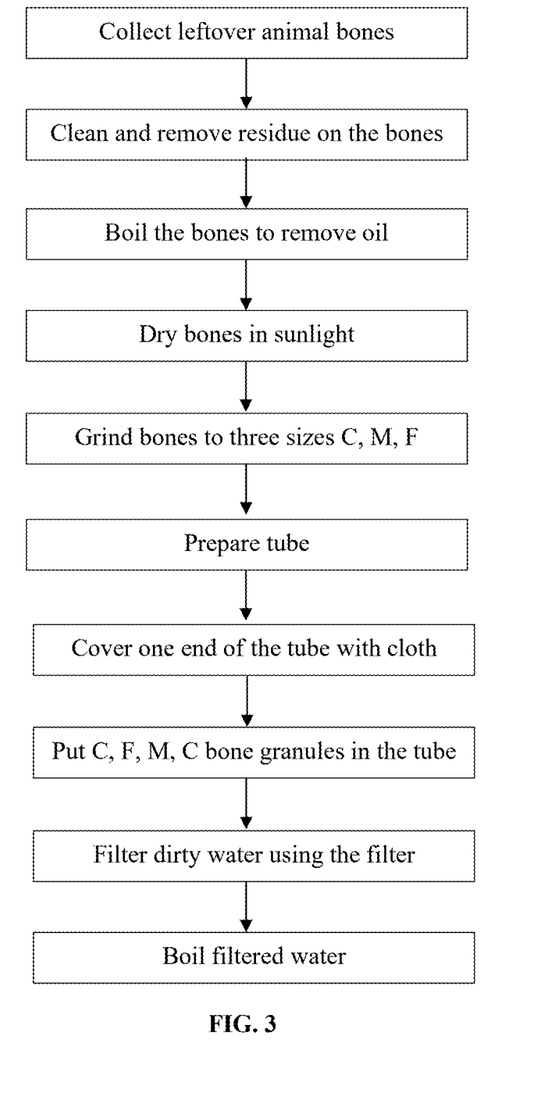
FIG. 3 illustrates a flow chart showing the process of using an exemplary water filter device according to an embodiment of the invention to filter water.

The present disclosure in another aspect provides a method of filtering water. FIG. 3 illustrates a flow chart of using an exemplary water filter device according to an embodiment of the invention to filter water. Now referring to FIG. 3, the exemplary method comprises the steps of obtaining an animal bone; boiling the animal bone to remove oil; drying the animal bone; grinding the animal bone to bone granules; sieving the bone granules into: coarse size granules having a diameter of 0.4-0.8 mm, medium size granules having a diameter of 0.2-0.4 mm, and fine size granules having a diameter of less than 0.2 mm; and obtaining a tube having a top end and a bottom end, wherein the bottom end is covered with a water permeable barrier; and placing the bone granules in the tube, in an order from the bottom end of the tube to the top end of the tube: a first layer of coarse size granules, a layer of fine size granules, a layer of medium size granules, and a second layer of course size granules; pouring water from the top of the water filter device; collecting filtered water from the bottom of the water filter; and boiling the collected water.

In some embodiments, the filtered water is drinkable. In some embodiments, the filtered water is drinkable before the boiling step.

Figure 4:
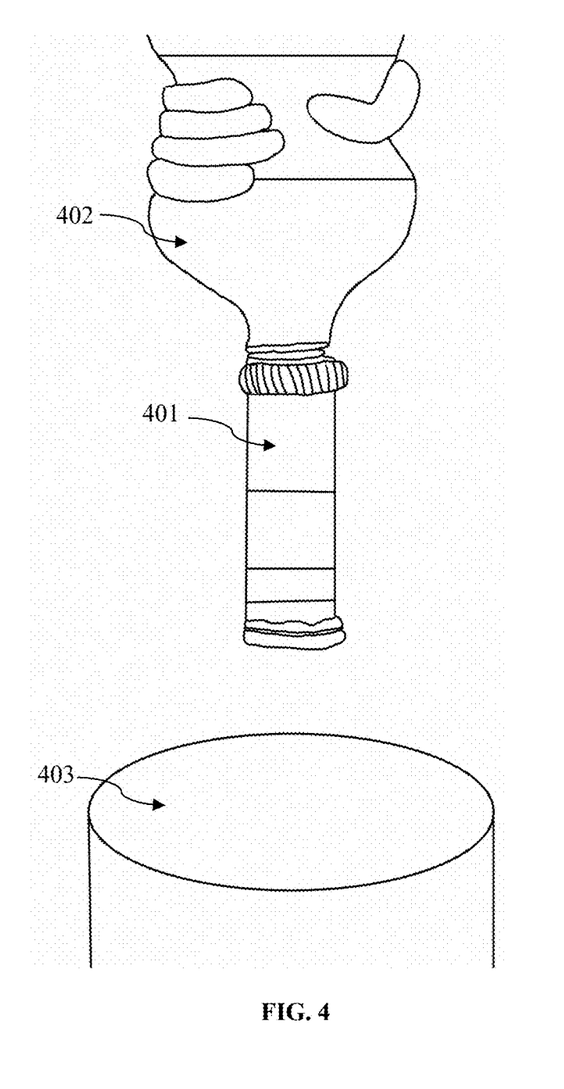
FIG. 4 illustrates an exemplary structure of a portable water filter device according to an embodiment of the invention.

FIG. 4 illustrates an exemplary portable setting of using the water filter device according to an embodiment of the invention to filter water. Now referring to FIG. 4, the exemplary portable water filter device comprises a tube 401 that contains a series layers of animal bone granules. The tube 401 has an opening of a size matching the opening of a typical plastic bottle 402. As illustrated in FIG. 4, the plastic bottle 402 filled with unfiltered water can connect to the tube opening, making it easy to filter the water through the water filter device. The filtered water can be collected in a container (e.g., a cup, bowl, bucket) 403.

Figure 5:
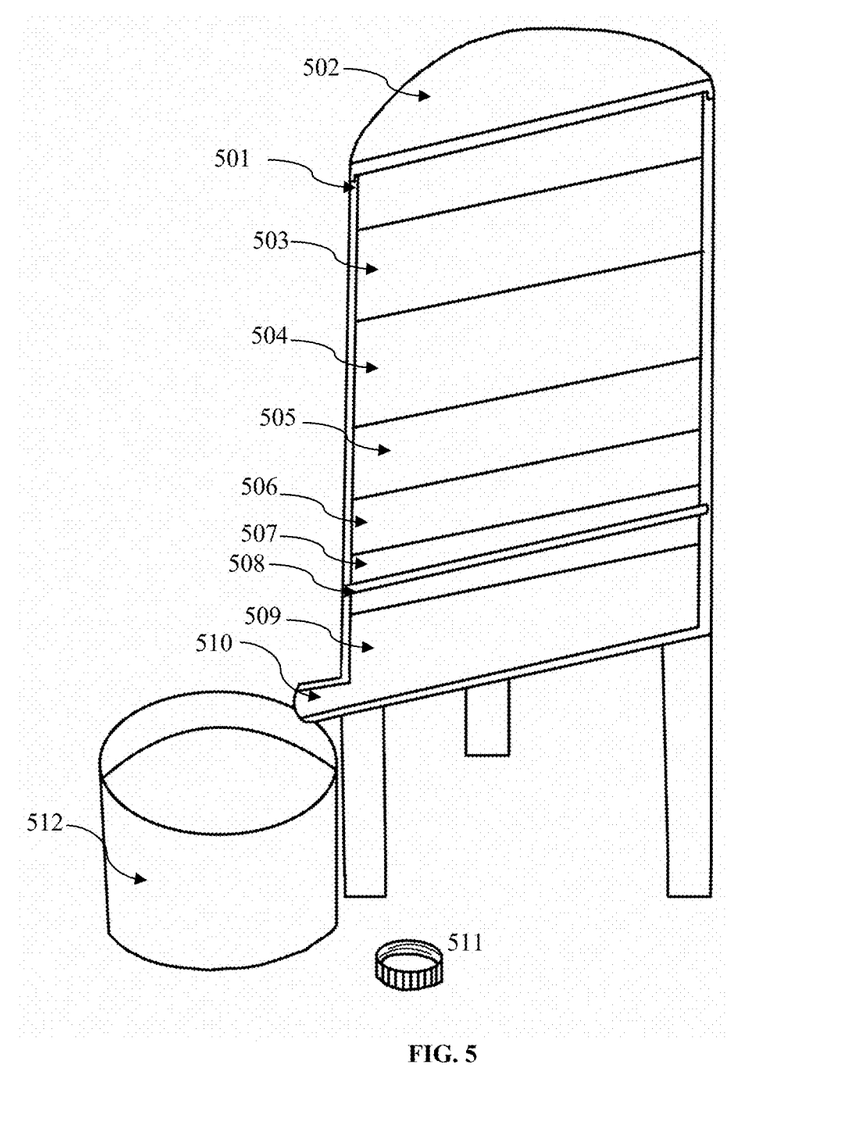
FIG. 5 illustrates an exemplary structure of a stationary water filter device according to an embodiment of the invention.

FIG. 5 illustrates an exemplary stationary setting of using the water filter device according to an embodiment of the invention to filter water. Now referring to FIG. 5, the exemplary stationary water filter device comprises a tube 501 that contains a series layers of animal bone granules. The tube 501 has legs to support the water filtration device and a removable lid 502 that can be open to add unfiltered water 503 and block out additional decries. In some embodiments, the unfiltered water 503 is added to maximum amount to create high pressure for filtration. The tube 501 contains a series animal bone granules including a layer of coarse size granules 504, a layer of medium size granules 505, a layer of fine size granules 506, and a second layer of coarse size granules 507. The tube 501 also has a barrier 508 embedded to the wall of the tube to prevent the leaking of animal bone granules. The tube 501 contains the filtered water 509 at its bottom. The tube also has an opening (e.g., an output mouth) 510 at the side of the tube. The opening 510 can be closed by a removable screw-on cap 511. As illustrated in FIG. 5, the filtered water can be collected from the opening 510 to a container (e.g. a receiver basin) 512.

Example 1

This example illustrates that trabecular cow bones can be used to filter out impurities in water.

Left-over femur bone was cut using a saw into 1-inch slices. The pieces of cow bone were boiled for three hours to remove soft tissue and were dried under sunlight for three days. Three slits were cut around the rim of cup to securely place bone. The dried bones were placed on the slit-cut cup. The trabecular bone portion with porous structure was identified to filter the water.

Tea was put on top of bone. Tea went through the trabecular bone into the cup. The process was repeated three times for data repeatability. Filtered tea had lighter color than the unfiltered tea, indicating that particles in the tea were filtered out by the bones.

Example 2

This example illustrates the effect of the cow bone pore size in filtering impurities in water.

Various parts of left over cow bones were collected. The cow bones were cut into one-inch slices. Smaller pores usually towards bone edges. To compare the effect of pore size on the results of water filtering, dirty water was directed to flow at the smaller or large pore size clusters separately. It was observed that increasing the pore size increased the turbidity of the water filtered through the bone, indicating that small pore size may increase the ability of the bone to filter impurities.

Example 3

This example illustrates that the bone powder can filter impurities in water.

Cow bone was boiled and dried. The dried cow bone was then grinded to create cow bone powder (CBP). A vinyl tube was cut into ~3½ inches parts using a knife. One end of the tube was covered by a cloth. One gram of CBP was put to the tube from the open end to create a water filter. A stand was created for the tube using paper. The water filter was filled with tea and put on the stand.

The results indicated that after filtration the rose tea had nearly no red color.

Example 4

This example illustrates the generation of a water filtration device using animal bone.

Leftover animal bones were collected. The collected bones were boiled for three hours to remove oil. Previous effects have been made to use calcination or extremely high temperature (usually around 1000° C. using a rotary kiln) to treat the bones. The highest temperature reached during the generation of my filter is 100° C., which increases filter accessibility by not using expensive equipment.

The boiled bones were then cleaned and the residues on the bones were removed. The cleaned bones were dried in sunlight for three days. The dried bones were grinded to granules, which were sieved to three sizes: coarse size granules having a diameter of 0.4-0.8 mm, medium size granules having a diameter of 0.2-0.4 mm, and fine size granules having a diameter of less than 0.2 mm.

Vinyl tubes of a diameter of about 1 inch were cut into a length of about 3.5 inches. One end (the bottom end) of the tube was covered with cloth and secured with rubber band. The bone granules were put into the tube in an order of the following: a layer of coarse size granules at the bottom end, a layer of fine size granules on top of the coarse size granules, a layer of medium size granules on top of the fine size granules, and a layer of coarse size granules on top of the medium size granules, each layer having a height of about 0.8 inch.

Dirty water was then filtered using the created water filter device. The filtered water was boiled, after which the water was ready to drink Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It may be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method of generating a water filter device comprising:
   (a) obtaining an animal bone;
   (b) boiling the animal bone to remove oil;
   (c) drying the animal bone;
   (d) grinding the animal bone to bone granules;
   (e) sieving the bone granules into:
   coarse size granules having a diameter of 0.4-0.8 mm,
   medium size granules having a diameter of 0.2-0.4 mm, and
   fine size granules having a diameter of less than 0.2 mm;
   (f) obtaining a tube having a top end and a bottom end, wherein the bottom end is covered with a water permeable barrier; and
   (g) placing the bone granules in the tube, in an order from the bottom end of the tube to the top end of the tube:
   a first layer of coarse size granules,
   a layer of fine size granules,
   a layer of medium size granules, and
   a second layer of coarse size granules.

2. The method of claim 1, further comprising before step (b) a step of cleaning the animal bone to remove residue on the animal bone.

3. The method of claim 1, further comprising before step (b) a step of cutting the animal bone into pieces.

4. The method of claim 1, wherein the water permeable barrier is a cloth.

5. The method of claim 1, wherein the tube is made of polyvinyl chloride.

6. The method of claim 1, wherein tube has a length of about 3.5 inches.

7. The method of claim 1, wherein the animal bone is grinded by a bean grinder.

8. The method of claim 1, wherein the animal bone is grinded by mortar and pestle.

9. The method of claim 1, wherein the animal bone is cow bone, lamb bone or pig bone.

10. The method of claim 1, wherein each layer of bone granules has a thickness of about 0.8 inch.

11. A method of filtering water comprising:
    obtaining a water filter device generated according to the method of claim 1;
    pouring water from the top of the water filter device; and
    collecting filtered water from the bottom of the water filter.

12. The method of claim 11, further comprising boiling the filtered water.

13. The method of claim 12, wherein the filtered water is drinkable.

* * * * *